US012700049B2

(12) United States Patent
Bauer

(10) Patent No.: US 12,700,049 B2
(45) Date of Patent: Aug. 4, 2026

(54) CONSTRUCTION METHOD AND ARRANGEMENT FOR CARRYING OUT A CONSTRUCTION PROJECT

(71) Applicant: BAUER Spezialtiefbau GmbH, Schrobenhausen (DE)

(72) Inventor: Thomas Bauer, Schrobenhausen (DE)

(73) Assignee: BAUER Spezialtiefbau GmbH, Schrobenhausen (DE)

( * ) Notice: Subject to any disclaimer, the term of this patent is extended or adjusted under 35 U.S.C. 154(b) by 322 days.

(21) Appl. No.: 18/260,535

(22) PCT Filed: Mar. 14, 2022

(86) PCT No.: PCT/EP2022/056492

§ 371 (c)(1),
(2) Date: Jul. 6, 2023

(87) PCT Pub. No.: WO2022/200098

PCT Pub. Date: Sep. 29, 2022

(65) Prior Publication Data

US 2024/0054577 A1 Feb. 15, 2024

(30) Foreign Application Priority Data

Mar. 25, 2021 (EP) .................................... 21164873

(51) Int. Cl.

*G06Q 50/08* (2012.01)
*E02D 7/00* (2006.01)
*E02D 13/06* (2006.01)

(52) U.S. Cl.

CPC ............... *G06Q 50/08* (2013.01); *E02D 7/00* (2013.01); *E02D 13/06* (2013.01); *E02D 2600/10* (2013.01)

(58) Field of Classification Search

CPC .... E02D 5/00; E02D 5/34; E02D 5/46; E02D 5/60; E02D 5/80; E02D 7/20; G05B 19/418; G06Q 10/06

(Continued)

(56) References Cited

U.S. PATENT DOCUMENTS 7,429,148 B2 * 9/2008 Verstraeten ............... E02D 5/32 405/240
8,684,108 B2 * 4/2014 Turner .................... E21B 44/00 702/9

(Continued)

FOREIGN PATENT DOCUMENTS

EP 3 296 467 A1 3/2018
EP 3 299 523 A1 3/2018

(Continued)

OTHER PUBLICATIONS

International Preliminary Report on Patentability (Chapter II) issued in PCT/EP2022/056492; completed Nov. 15, 2022.

(Continued)

*Primary Examiner* — Ronald D Hartman, Jr.
(74) *Attorney, Agent, or Firm* — Studebaker Brackett PLLC

(57) ABSTRACT

The invention relates to a construction method and an arrangement for carrying out a construction project involving the production of several foundation elements on a construction site by means of at least one construction apparatus, wherein based on information on starting conditions, in particular on the ground composition, and the at least one construction apparatus as well as specifications for the construction project with the foundation elements to be produced a method sequence with determination of manufacturing parameters for each foundation element to be produced is defined in a computer unit, on the basis of the defined method sequence with the defined manufacturing parameters the production of at least one foundation element is started, during the method sequence actual data are recorded when producing the foundation elements and supplied to the computer unit, the computer unit compares the recorded actual data with target data for the defined method sequence and in the case of a relevant deviation of the actual (Continued)

data from the target data a changed method sequence with changed manufacturing parameters and/or new target data for the foundation elements still to be produced is ascertained by the computer unit and forwarded to the at least one construction apparatus.

6 Claims, 1 Drawing Sheet

(58) Field of Classification Search
USPC ........................................................ 700/95
See application file for complete search history.

(56) References Cited

U.S. PATENT DOCUMENTS 10,872,302 B2 * 12/2020 Selvaraj ................ H04L 67/125
11,280,173 B1 * 3/2022 Buerger .................. E21B 44/00
11,466,420 B2 * 10/2022 Stengl ..................... E02D 5/187
2013/0155058 A1 * 6/2013 Golparvar-Fard ........................... G06Q 10/06311 345/419
2014/0219730 A1 * 8/2014 Coupland ............... E02D 29/16 405/287
2018/0012125 A1 * 1/2018 Ladha .................... G06N 3/044
2019/0325089 A1 * 10/2019 Golparvar-Fard .... G06T 19/003

FOREIGN PATENT DOCUMENTS

EP 3 569 769 A1 11/2019
EP 3 613 903 A1 2/2020
EP 3533932 B1 * 7/2020 ............... E02D 1/02

OTHER PUBLICATIONS

International Search Report issued in PCT/EP2022/056492; mailed Jun. 21, 2022.

* cited by examiner

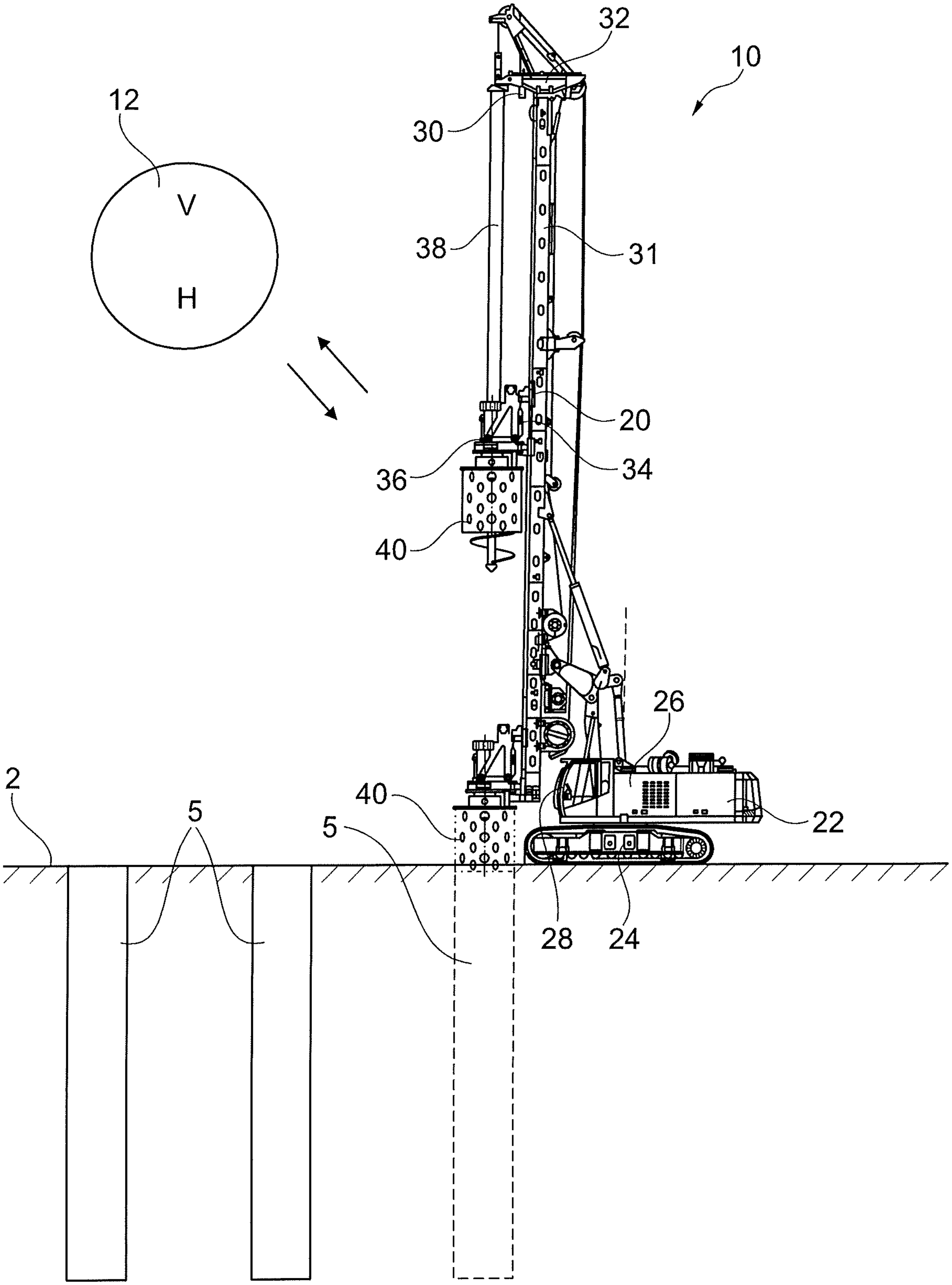
32
10
12
30
V
38
31
H
20
36
34
40
26
40
2
5
5
22
28
24

CONSTRUCTION METHOD AND ARRANGEMENT FOR CARRYING OUT A CONSTRUCTION PROJECT

The invention relates to a method and an arrangement for carrying out a construction project involving the production of several foundation elements on a construction site by means of at least one construction apparatus, respectively.

From EP 3 533 932 B1 a method and a system for producing a foundation element in the ground by means of a construction apparatus are known. In this case, with a ground working tool a hole is formed in the ground, in which the foundation element is produced. By means of a control and evaluation unit at least one operating variable of the construction apparatus, which changes depending on a ground composition, is recorded as a function of a working depth. In the control and evaluation unit a ground profile to be expected is entered which indicates a layer structure of the ground with ground layers of different ground composition. By way of the control and evaluation unit the recorded operating variable is set in correlation with the entered ground profile in order to establish, at which working depth a transition between ground layers of different ground composition is present.

In this known method local variations in the layer structure of the ground can be recorded directly when the foundation element is produced. The operating variable can in this case be a feed motion or a torque which change e.g. if a transition from a soft ground layer to a hard ground layer is present. The recording of the particular local ground profile during the production of the foundation element thus makes it possible for example to adapt the torque and a feed motion of a drilling tool so that a drilling progress as optimal as possible can be achieved.

Foundation elements are in most cases required in larger construction projects, i.e. for relatively large structures that necessitate a foundation to absorb high bearing loads. As a rule, this is accomplished in that a plurality of foundation elements, such as bored piles, are produced. Via its skin friction a bored pile is able to transfer great loads into deeper ground layers.

For the implementation of a construction project an on-schedule production of a foundation is of vital importance since a foundation prevails at the beginning of a construction project. Time delays in the foundation have the effect that all subsequent works are postponed. A delay in the production of the foundation elements can therefore have a significant impact in terms of time as well as from an economical aspect on the implementation of the entire construction project.

The invention is based on the object to provide a method and an arrangement for carrying out a construction project, with which foundation elements for a construction project can be produced in a particularly efficient and reliable manner.

The object is achieved on the one hand by a construction method and on the other hand by an arrangement. Preferred embodiments of the invention are stated in the respective dependent claims.

According to the invention a construction method is provided for carrying out a construction project involving the production of several foundation elements on a construction site by means of at least one construction apparatus, wherein

- based on information on starting conditions, in particular on the ground composition, and the at least one construction apparatus as well as specifications for the construction project with the foundation elements to be produced a method sequence with determination of manufacturing parameters for each foundation element to be produced is defined in a computer unit,
- on the basis of the defined method sequence with the defined manufacturing parameters the production of at least one foundation element is started,
- during the method sequence actual data are recorded when producing the foundation elements and supplied to the computer unit,
- the computer unit compares the recorded actual data with target data for the defined method sequence and
- in the case of a relevant deviation of the actual data from the target data a changed method sequence with changed manufacturing parameters and/or new target data for the foundation elements still to be produced is ascertained by the computer unit and forwarded to the at least one construction apparatus.

A basic idea of the invention resides in the fact that when planning the construction project the information available on starting conditions, in particular on the ground composition, and the at least one construction apparatus provided as well as on the specifications for the construction project and the resultant manufacturing parameters for the foundation elements to be produced are stored as target data in a computer unit. Thereby. the specifications can be a manufacturing time or a manufacturing date as well as specifications for the foundation elements. During the production of the individual foundation elements for the construction project actual data are recorded and supplied to the computer unit. In the computer unit the actual data can be compared with the target data whilst the process is still ongoing, whereby relevant deviations can be established in particular. These relevant deviations can, for example, reside in a different ground composition, for instance an unexpected rocky underground or also softer ground layers. These changes can in particular lead to changes in the manufacturing time of the foundation elements which can be calculated by the computer unit. In such a case the computer unit can ascertain and suggest changes of the manufacturing parameters including a change of the construction apparatus to be employed or of the tools to be used so that set targets for the construction project can be met, in particular a specified manufacturing date. In addition, set targets can be adapted as new target data. In this way, a quick response to changes can take place and in particular an on-schedule completion of foundation works with the production of the foundation elements and thus an on-schedule progress of the construction project can be achieved.

A particularly preferred embodiment of the method according to the invention resides in the fact that the foundation elements are produced through drilling with a drilling apparatus and/or cutting with a diaphragm wall cutter. In doing so, especially bored piles or diaphragm wall segments can be produced in the ground which are in particular formed by filling a hole produced through drilling or cutting with a hardenable mass, where appropriate with one or several reinforcement elements. Foundation elements of such type can transfer particularly high structural loads into deeper ground layers. However, these foundation elements of particularly high load-bearing capacity are laborious in production, and in the case of unexpected changes to the specifications, for example relating to given ambient conditions, more particularly the ground composition and the ground structure, major changes in the amount of work effort and therefore in the working time are likely to occur relatively easily.

By way of the method according to the invention these foundation elements can thus be produced in a particularly efficient and reliable manner.

According to another preferred variant of the method pursuant to the invention provision is made in that the manufacturing parameters comprise a torque, a feed force, a feed speed, a tool life and/or the selection and/or change of a tool. The manufacturing parameters can not only be set to achieve ground working in a most efficient or wear-reduced way possible but also to meet, where appropriate, a specified production date. If delays have occurred the feed rate or the torque can in particular be increased to achieve the set target, even if this affects an optimum tool life. In particular, this may be expedient from an economic viewpoint if a production failing to be on schedule were to lead to penalties for breach of contract in the construction project. In principle, a change of the tool or also a change of the construction apparatus, e.g. the use of a more powerful construction apparatus, can also be provided in this case.

Conversely, should the working conditions turn out to be easier the manufacturing parameters and, as the case may be, the further conditions can be changed in such a way that a more energy-efficient, more wear-reduced or otherwise more cost-efficient working is achieved.

According to an embodiment of the invention another advantageous option can be achieved in that the specifications for the construction project comprise a number, a position, dimensions and/or a load-bearing capacity of the foundation elements as well as details on production times, production dates and/or production costs. As a result, an especially target-oriented implementation of the project can be attained. In particular, if in the course of the process a significant change of the load-carrying capacity of the ground as an ambient condition is established it is possible to also change a number, a position and especially dimensions of the foundation element, i.e. specifications relating to the foundation element itself, in particular a depth of a foundation element to be produced. Especially in the case of a reduced load-bearing capacity of the ground it is thus possible to adapt the foundation elements in an efficient way in order to ensure a safe implementation of the project with achievement of set targets. In particular, the manufacturing parameters can be taken into account with regard to production times of the foundation elements, the production dates for the construction project and parts of the construction project as well as production costs.

Basically, the actual data can be recorded in any suitable way when the construction method is carried out. According to a further development of the invention it is particularly expedient that the actual data are recorded by at least one sensor means on the construction apparatus and/or by at least one stand-alone sensor means which is independent from a construction apparatus.

For data recording use can in particular be made of the sensor means that are generally present on a construction apparatus, such as sensors for recording the rotational speed, the feed motion, the feed force, the feed speed, the output power, the energy consumption etc. Alternatively or additionally, sensors can also be used independently of the construction apparatus, with which for example a depth progress can be recorded optically on the basis of the position of a drill rod.

Within the meaning of the invention basically all elements and structures produced in, at or on the ground are to be understood as foundation elements. These preferably serve to increase the load-bearing capacity. Alternatively or additionally, these can also serve to enclose a construction pit, to seal or cut off against water or for other reasons. According to a variant of the invention it is especially preferred that as foundation elements foundation piles, diaphragm wall segments, retaining and cut-off walls, dams, sealing bases, compacted ground regions, ground anchors and/or sheet piles are provided. The foundation elements are preferably of the same or of a similar design.

The foundation elements can be produced by different construction apparatuses individually or in a joint interaction. Alternatively or additionally to the drilling apparatuses and cutters already mentioned it is advantageous in accordance with a further development of the invention that the foundation elements are produced using diaphragm wall grabs, vibrators and/or mechanical impact devices, in particular diesel hammers and hydraulic hammers.

The specifications for a construction project can be the given ambient conditions on the construction site and in particular in the ground, technical specifications set by construction planning, in particular concerning design, load-bearing capacity and dimensioning of the foundation elements, as well as targets set by project planning, especially manufacturing times, manufacturing dates or manufacturing costs of the foundation elements. If changes to these specifications occur, the computer unit can ascertain which consequences a change of a single specification will have while manufacturing parameters remain unchanged, in particular with regard to set targets, such as manufacturing time, manufacturing date or manufacturing costs and perhaps also the load-bearing capacity. Insofar as a relevant deviation undesirable for the correct progress is established, one or several suitable measures can be suggested or introduced by the computer unit in order to still reach all or individual set targets.

In conjunction with this it is especially preferred that the computer unit ascertains a change of manufacturing parameters, tools and/or construction apparatuses, with which an on-schedule production of the remaining foundation elements is achieved. For this the manufacturing time and the manufacturing date can therefore serve as relevant set targets to change and adapt the further parameters in the method sequence.

Furthermore, it is advantageous that the starting conditions comprise the ground composition, specifications by authorities, for instance relating to working hours, noise emission, environmental specifications and/or weather conditions. Specifications by authorities can, for example, be legal regulations or provisions of building authorities, occupational safety and health administrations or environmental authorities stipulating regulations e.g. concerning night work and work on public holidays, maximum noise levels, periods of operation as well as environmental requirements. These have to be taken into consideration in the method sequence and in the planning thereof. Starting conditions can also comprise delivery conditions and delivery times of construction material. With regard to weather conditions account can be taken of the fact that e.g. below or above certain outdoor temperatures or in the case of strong winds work restrictions may be the consequence.

Another advantageous variant of the method according to the invention resides in the fact that based on actual data recorded during the method sequence the computer unit ascertains an actual ground composition of the building ground and compares this with the initial information on the ground composition and in that the computer unit ascertains a change to dimensions, in particular the depth, number and/or type or structure of the foundation elements in order that specifications for the produced foundation elements, in particular a specified load-bearing capacity, are achieved. Hence, in the course of the process changes in the specifications for the design of the foundation elements can also be directly ascertained and, if necessary, implemented by the computer unit. If ground conditions of lower load-bearing capacity are established, the foundation elements can be changed accordingly, in which case, if necessary, a change of the manufacturing parameters and perhaps also of the required tool or construction apparatus is then ascertained.

If ground conditions of load-bearing capacity are established, correspondingly smaller foundation elements or those of lower load-bearing capacity can be produced which can have a positive effect on manufacturing costs as well as the manufacturing time.

The invention further comprises an arrangement for carrying out a construction project involving the production of several foundation elements on a construction site by means of at least one construction apparatus, in particular pursuant to one of the previously described methods, wherein a computer unit is provided and designed to define a method sequence with determination of manufacturing parameters for each foundation element to be produced based on information on starting conditions, in particular on the ground composition, and the at least one construction apparatus as well as specifications for the construction project with the foundation elements to be produced, at least one sensor means is provided and designed to record actual data during the method sequence when producing the foundation elements and to supply these to the computer unit, and the computer unit is furthermore designed to compare the recorded actual data with target data for the defined method sequence and, in the case of a relevant deviation of the actual data from the target data, to ascertain a changed method sequence with changed manufacturing parameters and/or new target data for the foundation elements still to be produced and to forward this to the at least one construction apparatus.

By way of the arrangement the previously described advantages can be achieved in particular.

A preferred embodiment of the arrangement according to the invention resides in the fact that the computer unit is arranged in a construction apparatus, in a coordination center on the construction site or in a remote control center. Basically, the computer unit can also be designed as a cloud application so that a specific location is no longer given if a corresponding data link to the internet exists.

In another embodiment of the arrangement according to the invention it is advantageous that the at least one construction apparatus, in particular a foundation engineering machine, is designed to carry out a construction measure and comprises a machine-specific control unit which is connected to at least one sensor for recording data and to at least one actuator for actuating the construction apparatus, that at least one user point is provided which is spaced apart from the construction apparatus and designed for the input and/or output of data, wherein data can be transferred between the at least one construction apparatus and the at least one user point, that a central network computer having at least one first interface for the at least one construction apparatus and at least one second interface for the at least one user point is provided, and that via the network computer a continuous process chain is given in data processing and/or data transfer between the construction apparatus and the user point.

This aspect of the invention is based on the fact that a direct connection between the construction apparatus, which can also be referred to as a construction machine, and a user point is abandoned and a central network computer or a network computer unit is interconnected. The central network computer which can be the computer unit has at least one first interface for the at least one construction machine and at least one second interface for the at least one user point. By way of defined user points a defined and reliable data transfer can thus take place between the construction machine and the network computer on the one hand and the user point and the network computer on the other hand. Moreover, the network computer is designed to ensure a continuous process chain in data processing and/or data transfer between the construction machine and the user point. For this purpose, the network computer is equipped with a corresponding software that allows a direct data transfer between the user point and the construction machine. In particular, data can in this way be transferred in real time or almost in real time from the construction machine to the user point and especially also from one or several user points to the construction machine and preferably directly to the control of the construction machine.

The arrangement according to the invention can thus ensure a quick and reliable data exchange between at least one construction machine and at least one user point. In addition, the arrangement is designed to also ensure a data exchange with several construction machines and/or several user points. An efficient, quick data exchange promotes an efficient use of machines, material and staff on a construction site.

A preferred embodiment of the invention resides in the fact that the network computer with the at least one first interface is designed to receive data from the construction machine, to standardize the data to a specified format for the user point and forward these to the user point and/or that the network computer with the at least one second interface is designed to receive data from the user point, to standardize the data to a specified format for the computer unit of the construction machine and to forward these to the construction machine. Hence, the network computer with its interfaces is designed to transform different data formats received in a necessary way so that a data transfer can take place in real time or quasi-real-time, in particular with a time delay of less than 10 seconds, between the user point and the construction machine. This allows a continuous process chain between the user point and the construction machine, making it possible to transfer data preferably directly to the computer unit of the construction machine and in particular also to a control.

Conversely, a continuous rapid flow of data can also be ensured between construction machine and user point so that for example data from sensors and actuators can be directly queried and transferred via the computer unit of the construction machine. Likewise, a data transfer via the computer unit of the construction machine to one or several actuators is preferably also possible from the user point.

According to a further development of the invention it is especially advantageous that the first interface and/or the second interface are designed as a programmable interface. The interfaces are preferably so-called API interfaces that can be programmed for the respective application. The interfaces can be designed such that they are separate from the network computer or integrated into it. For each construction machine and/or each user point having an individual software and data format an individually adapted interface can be set up.

In particular, the interface can be designed and programmed for each individual construction machine and/or each user point according to the software present thereon and the data format required in each case. Each interface can in particular be designed such that an individual data format is received from the construction machine or user point and initially transformed to an internal data format of the network computer. Depending on the desired recipient this internal data format can then be transformed into the respectively required data format of the construction machine or user point and passed on to the recipient via the interface related thereto.

Basically, the arrangement according to the invention or the system according to the invention can be usefully applied with only one construction machine and only one user point. The arrangement according to the invention proves to be particularly advantageous if several construction machines and/or several user points are provided. In the case of a plurality of construction machines and user points individual or all construction machines and user points can be provided with a different software requiring different data formats. After the interfaces have been adapted on the network computer for a new construction machine or a new user point a continuous process chain can be ensured.

In conjunction with this it is especially advantageous that construction machines with different computer units are provided that require different formats for the data and/or that user points with computers are provided that require different formats for the data and that the different formats are standardized by different interfaces for the individual construction machines and/or user points.

Another advantageous embodiment of the invention resides in the fact that the data on the network computer can be saved in a uniform data format. Basically, data can also be transferred between construction machine and user point without being permanently saved. If provision is preferably made for a permanent saving of received data in the network computer in a uniform internal data format, it is possible to provide a central data pool concerning the construction site and the construction measures carried out, to which all user points and all construction machines can have access at any time. As a result, an up-to-date common data pool and a uniform information level can be achieved for all parties involved on a construction site, in particular for the user points and the construction machines as well as their operators. In addition, a central documentation on communication and on the progress of the construction measures can preferably be provided in a tamper-proof way.

In principle, any connection be set up between the network computer and the user points as well as the construction machine. In particular, the connection can be wireless or wire-based. According to a further development of the invention it is preferred that the at least one construction machine and/or the at least one user point is connected via an internet connection to the network computer. For this, a so-called cloud application can be provided in particular, in which case the network computer is to be attributed to the cloud. In this way, a simple and reliable data communication can be ensured in a particularly easy way, even if there is a great distance between the construction machines and the user points. More particularly, a reliable data exchange can also be ensured even if construction sites with construction machines and user points are distributed worldwide.

Furthermore, according to an embodiment of the invention it is especially expedient that the computer unit of the construction machine and/or a computer of the user point is provided with a browser software. In being matched to the respective hardware in the computer unit of the construction machine or to that of the computer of the user point, the browser software enables the display of data and information on a screen of the computer unit or the computer and the handling and processing of the data and information by the respective computer unit of the construction machine or the respective computer of the user point. For this purpose, the browser software can access the data in the network computer.

Another preferred embodiment variant of the invention resides in the fact that the computer unit of the construction machine is designed as a control for controlling the construction machine and that data can be transferred directly from the user point via the network computer to the control. The computer unit of the construction machine can be designed such that a direct transfer of data into a control as part of the computer unit of the construction machine only takes place on confirmation of the machine operator. For instance when producing a bore dimensional data, in particular relating to the depth of a borehole to produce a bored pile, can thus be transferred directly from a user point to the construction machine. The construction machine can then carry out the bore up to the desired depth, and on reaching the specified drilling depth the further drilling process is stopped by the control of the construction machine. In addition, positional data as well as all other data relevant for the implementation of a construction measure can be transferred directly from a user point to the construction machine. Conversely, a data transfer can take place from the control of the construction machine to the user point so that for example construction management can capture and query the current work status when a construction measure is carried out. Moreover, a direct logging of the work process of the construction measure is also possible by a third user point so that a tamper-proof documentation of the construction measures can be carried out e.g. by construction management or site supervision.

Furthermore, it is particularly preferred that the construction machine has a GPS unit for position determination and the computer unit is designed to generate a map display on a screen of the construction machine and that from the user point data relating to elements can be transferred to the computer unit and displayed directly in the map display on the screen of the construction machine. Through a GPS unit on the construction machine a reliable position determination and a position display of the construction machine on a map can initially be achieved. In doing so, the GPS data can be combined with a construction-site-specific position determination system, through which the position of the construction machine and, where applicable, of further components on a construction site can be recorded and determined with particularly high precision. As a result, a very accurate position determination can be achieved in combination with a customary GPS system. In such an overall system position data can be transferred directly from the user point to the construction machine so that this can be arranged precisely at a desired working position. Conversely, for construction measures carried out, e.g. produced foundation elements such as bored piles or diaphragm walls, precise position data can be transferred from the construction machine to a user point.

Basically, within the meaning of the invention a construction machine can be any chosen construction machine. According to a further development of the invention it is especially preferred that the at least one construction machine is a drilling apparatus, in particular a pile drilling apparatus or an anchor drilling apparatus, a diaphragm wall cutter, a grab, a pile driving apparatus, a vibrator or a crane. It is especially with such foundation engineering machines that construction measures are carried out directly in the ground and in particular foundation elements are produced in the ground, which require a particularly precise execution and position determination.

A method according to the invention is characterized in that a central network computer having at least one first interface for the at least one construction machine and at least one second interface for the at least one user point is provided and in that via the network computer a continuous process chain is formed in data processing and/or data transfer between the construction machine and the user point.

The method according to the invention can in particular be carried out using the previously described arrangement, whereby the previously described advantages result.

A preferred embodiment variant of the invention resides in the fact that data of the construction machine are received by the network computer, the data are standardized to a specified format for the user point and forwarded to the user point and/or that data of the user point are received by the network computer, the data are standardized to a specified format for the computer unit of the construction machine and forwarded to the construction machine. For this purpose the network computer is in particular designed with programmable interfaces that are each adapted to the individual construction machine and/or the individual user point with the respective computer and software structure. By preference, data received can initially be transferred into an internal uniform data format which, for the purpose of forwarding on, is then transformed again into the desired necessary individual data format of the construction machine or the user point.

According to a further development of the method pursuant to the invention it is especially advantageous that the data of the user point are transferred via the network computer directly to a control of the construction machine. Through this, control of the construction machine can be facilitated and made easier for a machine operator.

In principle, any construction measure can be carried out by way of the method. According to a further development of the invention it is particularly advantageous that as construction measure at last one foundation element is produced in the ground. The foundation element can be a foundation pile, a diaphragm wall segment, a base plate, an HDI element, an anchoring or the like.

In the following the invention is described in greater detail by way of a preferred embodiment illustrated schematically in the accompanying drawing.

The single FIGURE shows a schematic illustration of an arrangement 10 according to the invention with a construction apparatus 20 which is wirelessly connected to a remote computer unit 12 in order to carry out the construction method according to the invention. In the computer unit 12 an input can be made of information and data concerning specifications S for the construction project, in particular information on the ground composition, the at least one construction apparatus 20 employed and on the foundation elements 5 to be produced. Based on these specifications S, and according to construction planning, manufacturing parameters M can be ascertained and defined for each foundation element 5 to be produced. The manufacturing parameters M can be defined such that the foundation elements 5 are completed in their entirety by a particular manufacturing date. The manufacturing parameters M and all data necessary for the production of the foundation elements 5 in the course of a construction project are transferred from the computer unit 12 to a non-depicted control unit of the construction apparatus 20.

In the illustrated arrangement 10 the construction apparatus 20 is designed as a drilling apparatus with a carrier implement 22. The carrier implement 22 has a crawler-track running gear as undercarriage 24, on which an upper carriage 26 having a cabin 28 for the machine operator is supported in a rotatable manner. On the upper carriage 26 a mast 31 with a mast head 32 is vertically mounted in a pivotable manner. The mast 31 is designed as a leader, on the front side of which a carriage 34 with a drill drive 36 for a drill rod 38 is supported in a vertically displaceable manner. The drill rod 38 is designed as a Kelly rod which is suspended in a vertically movable manner via a rope on the mast head 32.

On the underside of the drill rod 38 a tool 40 is mounted which has an auger as exemplary and can be driven in a rotating manner via the drill drive 36 to produce a borehole for a foundation element 5.

When carrying out the construction method according to the invention several foundation elements 5 are to be produced in the ground 2. In the drawing a state is shown, in which two foundation elements 5 have already been produced and a third one is still being worked on. The foundation elements 5 can in particular be bored piles that are formed by filling a concrete suspension into a borehole produced by the construction apparatus 20. A further foundation element 5 is indicated by a dashed line, which is currently being produced by the construction apparatus 20 through introduction of the tool 40 into the ground 2. In the drawing the tool 40, together with the drill drive carriage, is also shown in a lower working position.

On the construction apparatus 20 a plurality of sensor means 30 is provided which, e.g. for the purpose of recording the rotational speed, a feed motion and further machine parameters, are directly integrated into the control of the construction apparatus 20. In the depicted FIGURE a sensor means 30 is only shown on the mast head 32 for illustration purposes, the said sensor means serving to record, for example, a position of the drill rod 38 as a measure for the produced depth of the foundation element 5.

The values recorded by the sensor means 30 are transmitted as actual data to the computer unit 12, in which these can be compared with the specifications S and the manufacturing parameters M as target data. If, in doing so, relevant deviations are established by the computer unit 12, changed manufacturing parameters M can be ascertained and forwarded to the construction apparatus 20 so that these are taken into account when producing further foundation elements 5 in the ground 2. In particular, by way of the construction method according to the invention it can be ensured that for example if a changed ground composition arises that might lead to delays of the manufacturing date of individual foundation elements 5 or the entirety thereof measures can be introduced to ensure on-schedule completion of the foundation works. To this end, in particular the rotational speed, feed motion or further manufacturing parameters M can be changed or a change of the tool 40 or of the entire construction apparatus 20 can even be indicated and/or initiated.

The invention claimed is:

1. A construction method for carrying out a construction project involving construction of foundation elements on a construction site by means of at least one construction apparatus, the construction method comprising:

storing in a memory specifications for the foundation elements of the construction project, manufacturing parameters of the at least one construction apparatus for constructing each foundation element among the foundation elements, and a construction schedule for constructing the foundation elements;

determining a deviation between actual data of a construction time of a foundation element among the foundation elements by the at least one construction apparatus according to a specification of the foundation element under the manufacturing parameters with target data for the construction time of the foundation element; and determining new manufacturing parameters for the at least one construction apparatus to construct all foundation elements still to be constructed based on the deviation and the construction schedule, wherein the at least one construction apparatus includes a drilling apparatus, the manufacturing parameters include a drilling speed of the drilling apparatus, a torque of the drilling apparatus, a feed force of the drilling apparatus, and a feed speed of the drilling apparatus, and the new manufacturing parameters include a new drilling speed of the drilling apparatus, a new torque of the drilling apparatus, a new feed force of the drilling apparatus, and a new feed speed of the drilling apparatus.

2. The construction method according to claim 1, wherein constructing each foundation element includes drilling with the drilling apparatus and cutting with a diaphragm wall cutter.

3. The construction method according to claim 1, further comprising recording the actual data by at least one sensor means on the at least one construction apparatus and/or by at least one stand-alone sensor means which is independent from a construction apparatus.

4. The construction method according to claim 1, wherein the foundation elements include piles, diaphragm wall segments, retaining and cut-off walls, dams, sealing bases, compacted ground regions, ground anchors and/or sheet piles.

5. The construction method according to claim 1, wherein the at least one construction apparatus includes diaphragm wall grabs, vibrators and/or mechanical impact devices including diesel hammers and hydraulic hammers.

6. The construction method according to claim 1, further comprising:

determining an actual ground composition of the construction site; and determining the new manufacturing parameters based on the actual ground composition.

* * * * *